US009160827B2

(12) United States Patent
Dave et al.

(10) Patent No.: US 9,160,827 B2
(45) Date of Patent: Oct. 13, 2015

(54) AUTOMATICALLY ADJUSTING COUNTRY AND AREA CODES WHEN DOING A BUSINESS CARD OR TELEPHONE NUMBER EXCHANGE

(75) Inventors: Swapnil R. Dave, Santa Clara, CA (US); Devrim Varoglu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/457,863

(22) Filed: Apr. 27, 2012

(65) Prior Publication Data

US 2013/0288649 A1 Oct. 31, 2013

(51) Int. Cl.
| H04M 3/42 | (2006.01) |
| H04M 1/2745 | (2006.01) |
| H04M 1/725 | (2006.01) |
| H04M 3/493 | (2006.01) |

(52) U.S. Cl.
CPC .... *H04M 1/274533* (2013.01); *H04M 1/72572* (2013.01); *H04M 3/42348* (2013.01); *H04M 3/4931* (2013.01); *H04M 1/274566* (2013.01)

(58) Field of Classification Search
CPC .... H04W 4/02; H04W 4/025; H04L 61/1594; H04M 2242/15; H04M 1/274533; H04M 1/274566
See application file for complete search history.

(56) References Cited

U.S. PATENT DOCUMENTS

| 5,241,589 A | 8/1993 | Jefferson |
| 5,475,743 A | 12/1995 | Nixon et al. |
| 6,782,278 B2 | 8/2004 | Chen et al. |
| 6,941,159 B2 | 9/2005 | Tsai et al. |
| 7,715,829 B2 | 5/2010 | Li et al. |
| 2002/0160815 A1 | 10/2002 | Patel et al. |
| 2004/0204117 A1 | 10/2004 | Weiner |

(Continued)

FOREIGN PATENT DOCUMENTS

| CN | 1653788 A | 8/2005 |
| CN | 1777207 A | 5/2006 |

(Continued)

OTHER PUBLICATIONS

Notification of First Office Action mailed Jul. 31, 2014 in Chinese Patent Application No. 201210263874.7, 17 pages.

(Continued)

*Primary Examiner* — Vladimir Magloire
*Assistant Examiner* — Shantell L Heiber
(74) *Attorney, Agent, or Firm* — Kilpatrick Townsend & Stockton LLP (57) ABSTRACT

A telephone number is automatically adjusted in the context a business card or other telephone number exchange. The country code, area code, or other prefix portion is added, removed, or modified based on a location associated with the telephone number and/or a location associated with the recipient. In one example, a sending device looks up location information by contacting the service provider, using locally-stored information, or otherwise, and, based on this information, includes an appropriate prefix. The sending device can also use a location associated with the recipient in determining an appropriate prefix or adjusting a received prefix, for example, based on the recipient's own telephone number. Adjustments to telephone numbers can also be made by recipient devices, intermediary devices, and any other devices that may be involved in the exchange of telephone numbers, business card information, or related activities, and in other contexts as well.

24 Claims, 7 Drawing Sheets

(56) References Cited

U.S. PATENT DOCUMENTS

| | | |
|---|---|---|
| 2005/0176411 A1 | 8/2005 | Taya et al. |
| 2006/0046785 A1 | 3/2006 | Cagney |
| 2006/0094353 A1* | 5/2006 | Nielsen et al. .................. 455/17 |
| 2006/0105790 A1 | 5/2006 | Jin et al. |
| 2006/0140384 A1* | 6/2006 | Plunkett et al. .......... 379/221.02 |
| 2006/0177043 A1 | 8/2006 | Li et al. |
| 2007/0129959 A1* | 6/2007 | Bransky et al. ................... 705/1 |
| 2008/0043718 A1 | 2/2008 | Chu |
| 2008/0167083 A1 | 7/2008 | Wyld et al. |
| 2008/0292092 A1 | 11/2008 | LaPorte et al. |
| 2009/0034705 A1* | 2/2009 | Janssen ................... 379/142.06 |
| 2010/0146639 A1* | 6/2010 | Kim et al. ....................... 726/28 |
| 2010/0157986 A1* | 6/2010 | Rao et al. ...................... 370/352 |
| 2011/0044438 A1* | 2/2011 | Wang et al. ................ 379/93.02 |
| 2011/0044443 A1 | 2/2011 | Dai |
| 2011/0070890 A1* | 3/2011 | Wu .............................. 455/445 |
| 2011/0116613 A1 | 5/2011 | Aahlin |
| 2011/0143711 A1 | 6/2011 | Hirson et al. |
| 2011/0158396 A1 | 6/2011 | Eichen et al. |

FOREIGN PATENT DOCUMENTS

| | | |
|---|---|---|
| EP | 1441557 A2 | 7/2004 |
| EP | 1505805 A1 | 2/2005 |
| EP | 1659817 A2 | 5/2006 |
| EP | 2299666 A2 | 3/2011 |
| JP | 2001-119750 A | 4/2001 |
| JP | 2003-333165 | 11/2003 |
| JP | 2011192195 | 9/2011 |
| KR | 10-2006-0024263 A | 3/2006 |
| KR | 10-0960248 | 6/2010 |
| WO | 2004/021723 A1 | 3/2004 |
| WO | 2005/096603 A1 | 10/2005 |

OTHER PUBLICATIONS

Office Action mailed Nov. 8, 2013 in U.S. Appl. No. 13/225,204, 11 pages.
Office Action mailed Feb. 22, 2013 in U.S. Appl. No. 13/225,204, 13 pages.
International Search Report mailed Aug. 23, 2012 in PCT Application No. PCT/US12/39466, 3 pages.
European Search Report mailed Nov. 27, 2012 in EP Application No. 12170364.9, 6 pages.
International Search Report mailed Jul. 11, 2013 in PCT Application No. PCT/US2013/035771, 10 pages.
Office Action mailed Aug. 19, 2013 in U.S. Appl. No. 13/225,204, 11 pages.
English Translation of Office Action mailed Jul. 30, 2013 in KR 10-2012-59333, 4 pages.

* cited by examiner

AUTOMATICALLY ADJUSTING COUNTRY AND AREA CODES WHEN DOING A BUSINESS CARD OR TELEPHONE NUMBER EXCHANGE

BACKGROUND

The present disclosure relates in general to communication between electronic devices and in particular to communicating phone number and other contact information between two electronic devices, such as a between two cellular telephones.

Mobile devices, including smart phones, personal digital assistants, and tablet computers, are rapidly becoming ubiquitous. These devices are increasing being used to make voice and video calls and to store contact information useful in establishing such calls. For example, a user of a smart phone device can typically save contact information records for themselves and others on the device. The contact information records include information about home addresses, business addresses, phone numbers, e-mail addresses, etc. and can be used to initiate direct communication with the associated contacts. For example, the smart phone user may open a contact and initiate a one touch command to call that contact's cellular telephone number. As another example, a user may click on a contact name displayed in a contact's listing and select to send an e-mail or text message to the selected contact.

Contact information records contain useful information about a person's contacts and can be shared with others in various ways. Contact information records can be sent via e-mail, Short Message Service (SMS), Bluetooth, WI-FI, using specific business card and contact tracking applications, and using other options. The vCard format is a file format for storing and exchanging electronic business cards that allows the vCards to be exchanged as attachments to e-mail messages, through instant messaging, and in other ways on the Internet. A first user may, for example, sends a text message with his or her vCard to a second user so that the second user can easily contact the first user. Once the second user has the vCard, the second user can use the telephone number and other contact information from the vCard to call or otherwise contact the first user. Phone numbers and other contact information used in vCards is, however, sometimes inaccurate, for example, in that location differences are not addressed. Dialing prefixes may be missing or inaccurate. This can result in failed call attempts and require significant effort on the part of the user to identify and enter an appropriate dialing prefix.

SUMMARY

Certain embodiments of the present invention provide techniques for automatically adjusting a telephone number when doing a business card or telephone number exchange. For example, the country code, area code, or other prefix portion of the telephone number may be added, removed, or modified based on a location associated with the telephone number and/or a location associated with the recipient. In the circumstance in which the telephone number is the number of the sending device, the sending device can look up location information by contacting the service provider, analyzing the local subscriber identification module (SIM) card, or otherwise, and, based on this information, include (or not include) an appropriate prefix. The sending device can also use a location associated with the recipient in determining an appropriate prefix, for example, based on the recipient's own telephone number or other recipient location identifying information. Adjustments to telephone numbers can also be made by recipient devices, intermediary devices, and any other devices that may be involved in the exchange of telephone numbers, business card information, or related activities. Telephone numbers can be adjusted in other contexts as well. For example, telephone numbers displayed on web pages, e-mails, or otherwise accessed from remote devices can be adjusted based on location information associated with the telephone number and/or location information associated with the recipient of the telephone number.

The following detailed description together with the accompanying drawings will provide a better understanding of the nature and advantages of the present invention.

DETAILED DESCRIPTION

Certain embodiments of the present invention provide techniques for automatically adjusting a telephone number when doing a business card or telephone number exchange. For example, the country code, area code, or other prefix portion of the telephone number may be added, removed, or modified based on a location associated with the telephone number and/or a location associated with the recipient. In the circumstance in which the telephone number is the number of the sending device, the sending device can look up location information by contacting the service provider, analyzing the local SIM card, or otherwise, and, based on this information, include (or not include) an appropriate prefix. The sending device can also use a location associated with the recipient in determining an appropriate prefix, for example, based on the recipient's own telephone number or other recipient location identifying information. Adjustments to telephone numbers can also be made by recipient devices, intermediary devices, and any other devices that may be involved in the exchange of telephone numbers, business card information, or related activities. Telephone numbers can be adjusted in other contexts as well. For example, telephone numbers displayed on web pages, e-mails, or otherwise accessed from remote devices can be adjusted based on location information associated with the telephone number and/or location information associated with the recipient of the telephone number.

A device ("sending device") sending a phone number to another device ("recipient") can determine whether to modify a phone number and how the phone number should be modified based on location information associated with the phone Dumber. For example, consider a cellular telephone device (sending device A) sending cellular telephone device A's phone number to a recipient cellular telephone device (recipient device B). The sending device A has a telephone number from a service provider and calling that telephone number from elsewhere requires that a prefix be added to the beginning of the telephone number. When the sending device A determines to send the telephone number, it can determine an appropriate prefix to acid and modify the telephone number to be sent with to include that prefix. The appropriate country code, area code, and/or other appropriate prefix digits may be added to the telephone number. Modifying a telephone number may additionally or alternatively involve adding or modifying exit codes and/or entry codes, e.g., depending on whether the telephone numbers are associated with different counties. The recipient receives a number that requires little or no modification or manual lookup of dialing codes and the like prior to use.

The sending device A may determine a prefix based on its location. For example, the sending device A may communicate with a service provider to access sending device A's phone registration information. It may ping the service provider for location information so that it can receive or itself determine an appropriate prefix or request location information from another external source. In the circumstance of the service provider providing such information, the service provider may maintain a database of codes or other information to respond to such requests. In an alternative example, the sending device may retrieve location or prefix information from local storage or from an attached device or module such as on a subscriber identification module (SIM) card.

In modifying the phone number for sending to recipient B, sending device A may use information about the location of recipient device B. For example, sending device A is sending a phone number to a sending device B using short message service (SMS), the SMS messaging information known to sending device A (e.g., recipient device B's number) can be used to identify in which country and/or region the recipient's device is registered, e.g., registered on a home location register (HLR). For example, sending device A may identify that the recipient device B is registered in the United States and modify the telephone number being sent so that it includes an appropriate prefix for calling from the United States to the region in which sending device A's telephone number is registered. The recipient can then call the sending device's phone number with little or no modification of the telephone number and without having to look up dialing codes and the like.

In an alternative circumstance, a sending device can modify a telephone number being sent to a recipient even if the telephone number is not the telephone number of the sending device. The telephone number may be the telephone number of another device, for example. In such a circumstance, the sending device can obtain location and/or prefix information for the telephone number in various ways. In one example, the sending device pings the service provider the telephone number for location and/or prefix information. In another example, the sending device sends a message to the other device (e.g., using the telephone number) and the other device pings the service provider and returns the requested information to the sending device. As a specific example of this, if sending device A wants to send the telephone number of a third device C to recipient device B, sending device A can ask the third device C for its location and/or prefix information, the third device C can ping its service provider for the information and return that information to sending device A, and sending device A can then use the information to send a modified phone number of third device C to recipient device B.

In another example, location information for a telephone number is determined by identifying associated location information in other ways. For example, if the telephone number is a home number in a contact information record, the home address stored in the same record can be used to determine the location information and ultimately to determine an appropriate prefix or other modification.

Telephone number modification techniques can also be employed on recipient devices and intermediary devices. For example, a recipient may receive a telephone number and determine to add a prefix based on identification of a location associated with the received telephone number and/or the location associated with the recipient. As another example, a recipient may receive a telephone number with a prefix already included, determine that some or all of the prefix is unnecessary or requires modification based on identification of a location associated with the received telephone number and/or the location associated with the recipient, and modify the telephone number accordingly.

Techniques for automatically adjusting telephone numbers are particularly useful in the context of business card or vCard exchanges in which cellular phone, office phone, home phone, and other phone numbers are exchanged.

Telephone number modification techniques can also be employed in other contexts. For example, a telephone number can be modified when accessed while viewing a web page. As a specific example, if a user accesses a particular restaurant's web page (or a web page associated with any other real-world business) and selects the restaurant's phone number to retrieve or dial, an automatic process can identify an appropriate prefix to add to the number or other modification to the number based on the restaurant's location and/or the location associated with the device of the user that is viewing the webpage and requesting/calling the number. The restaurant's location and/or an appropriate prefix can be identified in various ways including, but not limited to, by identifying an Internet Protocol (IP) address associated with the web page, by identifying a tag or field on the web page that provides location and/or prefix information, or by another mechanism.

Another context in which automatic telephone number modification techniques is beneficial is where a single number is being distributed to multiple recipients. The number can be adjusted to target each of the particular recipients so that each recipient receives a number with an appropriate prefix or no prefix if none is needed. Thus, for example, a conference call organizer can send out a conference call dial-in number by simply sending a single number or reduced set of numbers that are automatically adjusted for each of the recipients.

The example embodiments described below relate to a configuration in which a telephone number is modified based on location and/or prefix information; however, it is to be understood that the techniques described herein can be applied equally to the other types of contact information that are location sensitive. For example, time zone information can be adjusted for a contact information record. Further, while the example embodiments described below make specific reference to a mobile device such as a mobile phone, it is to be understood that other types of devices can be substituted and that embodiments of the present invention can be applied in connection with providing contact information between any devices.

Figure 1:
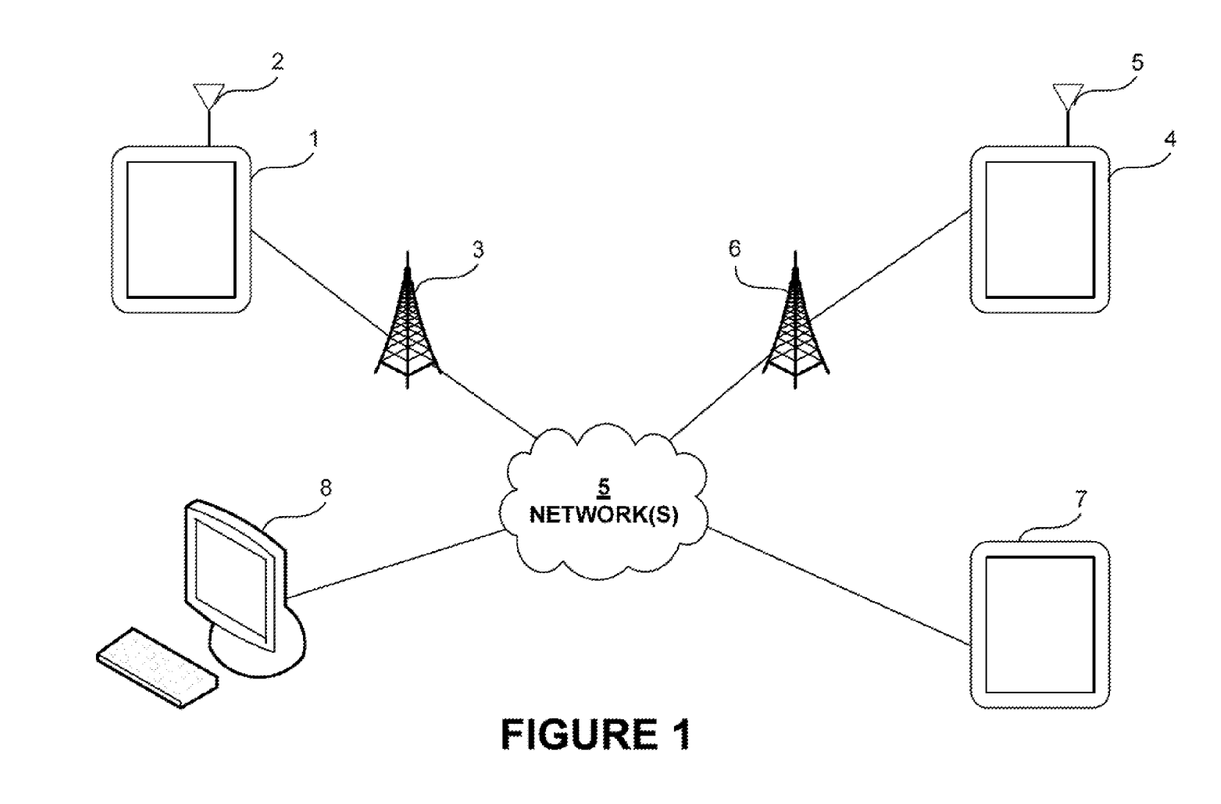
FIG. 1 is a diagram of exemplary devices used in the exchanges of telephone numbers according to some embodiments of the present invention.

FIG. 1 is a diagram of exemplary devices 1, 4, 7, 8 used in exchanges of telephone numbers according to some embodiments of the present invention. Any of the devices 1, 4, 7, 8 may send and receive a telephone number to any of the other devices 1, 4, 7, 8. The telephone number may be sent in a variety of ways. As examples, the telephone number may be sent in a text message, e-mail, Bluetooth, Wi-Fi, or otherwise, as part of a contact information record sent via text, e-mail, Bluetooth, Wi-Fi, or otherwise, or through any other mechanism through which one device can exchange information with another device.

In FIG. 1, device 1 is a cellular telephone with an antenna 2 used to communicate with a cellular tower such as cellular tower 3 to send and receive telephone calls and information. Device 4 is similarly, a cellular telephone with an antenna 5 used to communicate with a cellular tower such as cellular tower 6 to send and receive telephone calls and information. These devices 1, 4 may additionally or alternatively use non-cellular communication technologies to send and receive telephone calls and information. Device 7 is a mobile device that sends and receives telephone calls and information by connecting to network 5 through a wired and/or wireless connection. Device 8 is a personal computer that similarly scuds and receives telephone calls and information by connecting to network 5 through a wired and/or wireless connection. Devices 1, 4, 7, 8 may be associated with locations in the same are or different areas such that dialing prefixes may be required or not required when calls are placed between the respective devices 1, 4, 7, 8.

Figure 2:
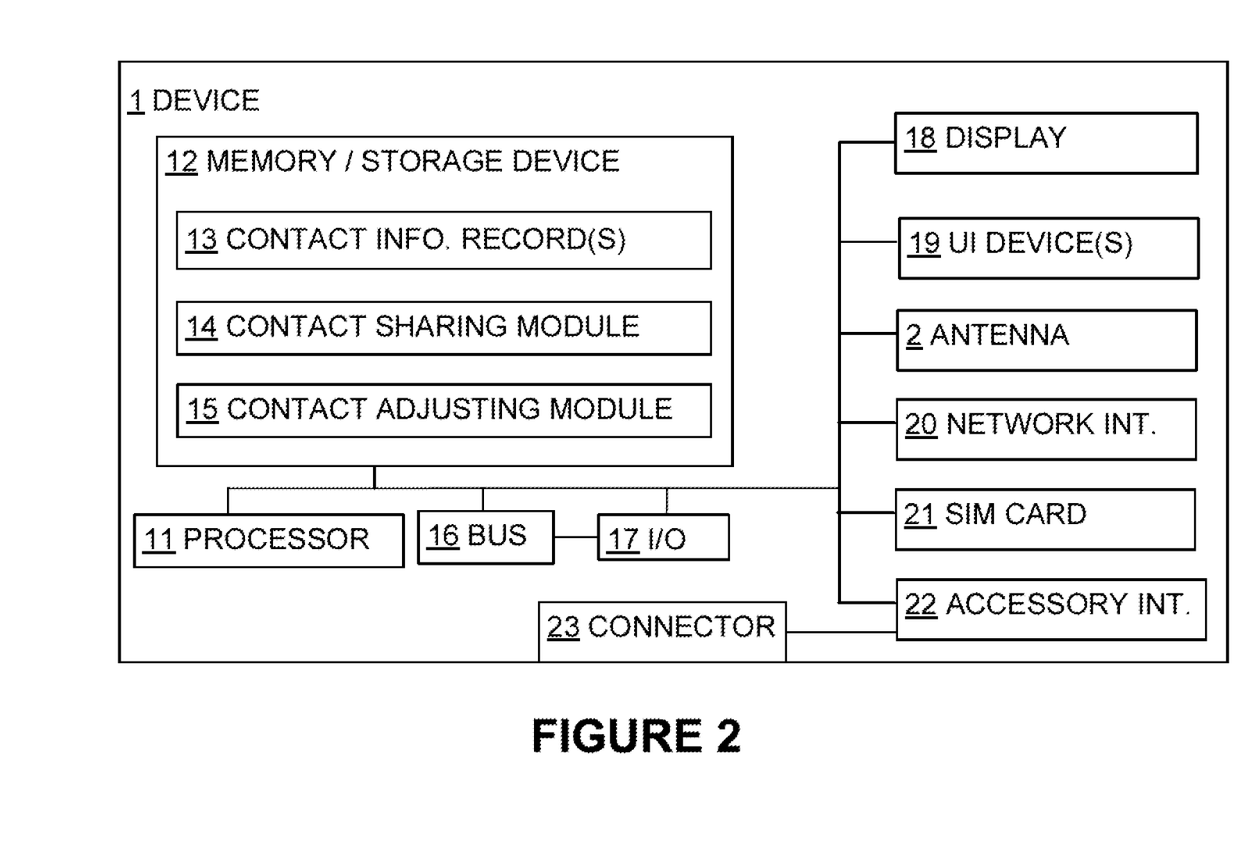
FIG. 2 is a simplified block diagram of a device according to an embodiment of the present invention.

FIG. 2 is a simplified block diagram of device 1 according to an embodiment of the present invention. In this embodiment, device 1 can provide computing, communication and/or media playback capability. The device 1 has a processor 11, a memory/storage device 12, a bus 16, input/output connections 17, a display 18, user interface (UI) device(s) 19, an antenna 2, a network interface 20, a SIM card 21, an accessory interface 22, and a connector 23. These components are merely illustrative to provide exemplary components of an exemplary cellular telephone device. Other cellular telephones and other devices including, but not limited to, the exemplary devices 4, 7, and 8 of FIG. 1 may include different components and still be configured to implement the methods, techniques, and systems disclosed herein.

In the embodiment shown, device 1 can be a smart phone with a 3.5-inch (diagonal) widescreen multi-touch display. In other embodiments, device 1 can have a variety of form factors and configurations, e.g., a tablet, personal digital assistant, media player, portable web browser, etc.

Processor 11, which can be implemented as one or more integrated circuits (e.g., one or more conventional single-core or multi-core microprocessors or microcontrollers), can control the operation of device 1. In various embodiments, processor 11 can execute a variety of programs in response to program code and can maintain multiple concurrently executing programs or processes. At any given time, some or all of the program code to be executed can be resident in processor 11 and/or in storage media such as memory/storage device 12. Thus, through suitable programming, processor 11 can provide various functionality for device 1. Processor 11 can respond to user input and operate other programs and program modules to control other functions of device 1. For example, processor 11 may execute program code comprised in contact sharing module 14 and/or contact adjusting module 15 to provide the functionality provided by these modules 14, 15. Such program modules 14, 15 can implement contact sharing and contact adjusting features as described herein.

Memory/storage device 12 can be implemented in various ways, e.g., using disk, flash memory, or any other non-volatile storage medium. In some embodiments, storage device 12 can store media assets such as audio, video, still images, or the like, that can be played by device 1. Storage device 12 can also store other information such as a user's contacts contact information records 12 with names, addresses, phone numbers, etc., scheduled appointments and events, notes, and/or other personal information. In some embodiments, storage device 12 can store one or more application programs to be executed by processor 10 (e.g., video game programs, personal information management programs, media playback programs, etc.). In the example of FIG. 2, device 1 includes a contact sharing module 14 for sharing contact information records 13 with other devices such as devices 4, 7, 8 of FIG. 1. In the example of FIG. 2, device 1 further includes a contact adjusting module 15 for modifying contact information records 13 being sent to and/or received from other devices such as devices 4, 7, 8 of FIG. 1.

In some embodiments display 18 and UI device(s) 19 include a touch screen display surrounded by bezel with one or more control buttons provided in the bezel that can be used, e.g., to wake device 1 from a hibernation state, to put device 1 into a hibernation state, or to receive other input. Generally, UI device(s) 19 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface device(s) 19 to invoke the functionality of device 1 and can view and/or hear output from device 1 via output devices of user interface device(s) 19.

Device 1 can also have a wireless network interface 20, indicated by antenna 2, permitting access to a voice and/or data network. Antenna 2 can be external or built into the housing of device 1. Any type of network access can be supported, and device 1 can provide wired network interfaces (e.g., Ethernet) in addition to or instead of a wireless interface. Network interface 20 can provide voice and/or data communication capability for device 1. In some embodiments network interface 20 can include radio frequency (RF) transceiver components for accessing wireless voice and/or data networks (e.g., using cellular telephone technology, advanced data network technology such as 3 G, 4 G, EDGE, Wi-Fi (IEEE 25 802.11 family standards), or other mobile communication technologies, or any combination thereof), GPS receiver components, and/or other components. In some embodiments network interface 20 can provide wired network connectivity (e.g., Ethernet) in addition to or instead of a wireless interface. Network interface 20 can be implemented using a combination of hardware (e.g., antennas, modulators/demodulators, encoders/decoders, and other analog and/or digital signal processing circuits) and software components.

SIM card 21 comprises an integrated circuit that securely stores subscriber identity information such as an International Mobile Subscriber Identity (IMSI) and a related key used t identify and authenticate subscribers on mobile telephone and computing devices. In some embodiments, a SIM card includes a unique serial number (ICCID), an IMSI, security authentication and ciphering information, information related to the local network, identification of accessible services and passwords. SIM card 21 is removable and can be transferred to different mobile telephone and computing devices.

Accessory interface 22 can allow device 1 to communicate with various accessories. For example, accessory interface 22 can support connections to a computer, an external speaker or media playback station, a digital camera, a radio tuner (e.g., FM, AM and/or satellite), an in-vehicle entertainment system, an external video device, card reader, disc reader, or the like. In some embodiments, accessory interface 22 can include a connector 23, such as a 30-pin connector corresponding to the connector used on iPod® and iPhone® products, as well as supporting circuitry. The connector 23 can provide connections for power and ground as well as for various wired communication interfaces such as Universal Serial Bus (USB), FireWire (IEEE 1394 standard), and/or universal asynchronous receiver/transmitter (UART). The connector can also provide connections for audio and/or video signals, which may be transmitted to or from device 1 in analog and/or digital formats. Thus, accessory interface 22 can support multiple communication channels, and a given accessory can use any or all of these channels.

In some embodiments, accessory interface 22 can include a wireless interface. For example, a Wi-Fi interface and/or a Bluetooth interface (a short-range wireless interface complying with Bluetooth specifications promulgated by Bluetooth SIG, Inc.) Infrared, ultrasonic, and/or other wireless interfaces can also be used.

The connector 23 may be recessed into a bottom surface of the device 1, allowing the device 1 to dock with an accessory device or receive a connecting cable. Connector 23 can include a number of pins for carrying power, analog, and digital signals. In one embodiment, connector 23 can be implemented as a 30-pin docking connector as used in existing iPod® and iPhone® products sold by Apple Inc., assignee of the present application. Other connectors can also be used.

It will be appreciated that the system configurations and components described herein are illustrative and that variations and modifications are possible. The device 1 may have other capabilities not specifically described herein (e.g., tablet functionality, global positioning system (GPS), broadband data communication, Internet connectivity, etc.).

Further, while the device 1 is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 3:
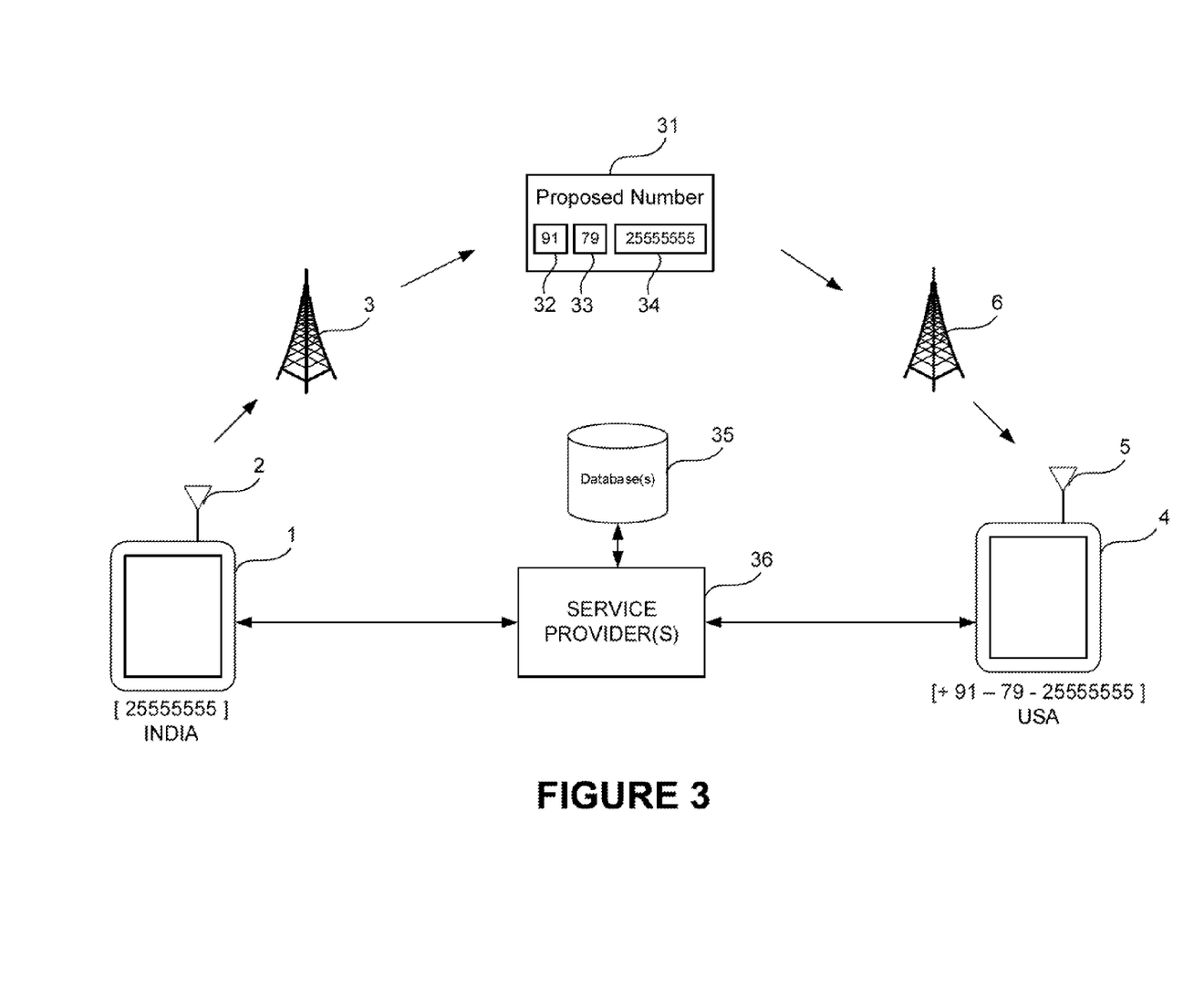
FIG. 3 is a diagram of an exchange of a telephone number from one device to another device according to an embodiment of the present invention.

FIG. 3 is a diagram of an exchange of a telephone number from one device 1 to another device 4, according to an embodiment of the present invention. In this example, device 1 is a cellular telephone device registered in India with a local telephone number of "25555555." Device 1 determines to send its phone number to device 4. Prior to sending the number however, device 1 determines whether it should modify the phone number or not. In this example, device 1 recognizes that it is sending the phone number to device 2 via a United States registered telephone number and thus determines that it should append an appropriate prefix to the local telephone number.

To determine an appropriate prefix, device 1 communicates with service provider(s) 36. For example, device 1 may ping service provider(s) 36 for an appropriate county and area code corresponding to the location in which device 1 is registered in India. The service provider(s) 36 receiving such a request may obtain this information from database(s) 35 or the like and return an appropriate response to device 1. In an alternative embodiment, device 1 receives location information, e.g., identification of a geographic area that corresponds to the location in which device 1 is registered in India, and itself determines or identifies and appropriate prefix using that location information. In another embodiment, device 1 obtains an appropriate prefix without contacting service provider(s), for example, by retrieving such information locally from a SIM card 21 or the like.

Once device 1 has identified an appropriate prefix it prepends the prefix to the number and sends it to device 4. In this example, the message is sent through tower 3 through one or more intermediate networks to tower 6 from which it is distributed to device 4. The proposed number 31 sent includes the local number 34 "25555555," a country code 32 "91," and an area code 33 "79." Entry or exit codes may also be appended in certain embodiments. Device 4 receives the proposed number 31 and stores it for later use. A user of computer device 4 can call device 1 without having to manually lookup and/or input the necessary country or area codes in this case.

Figure 4:
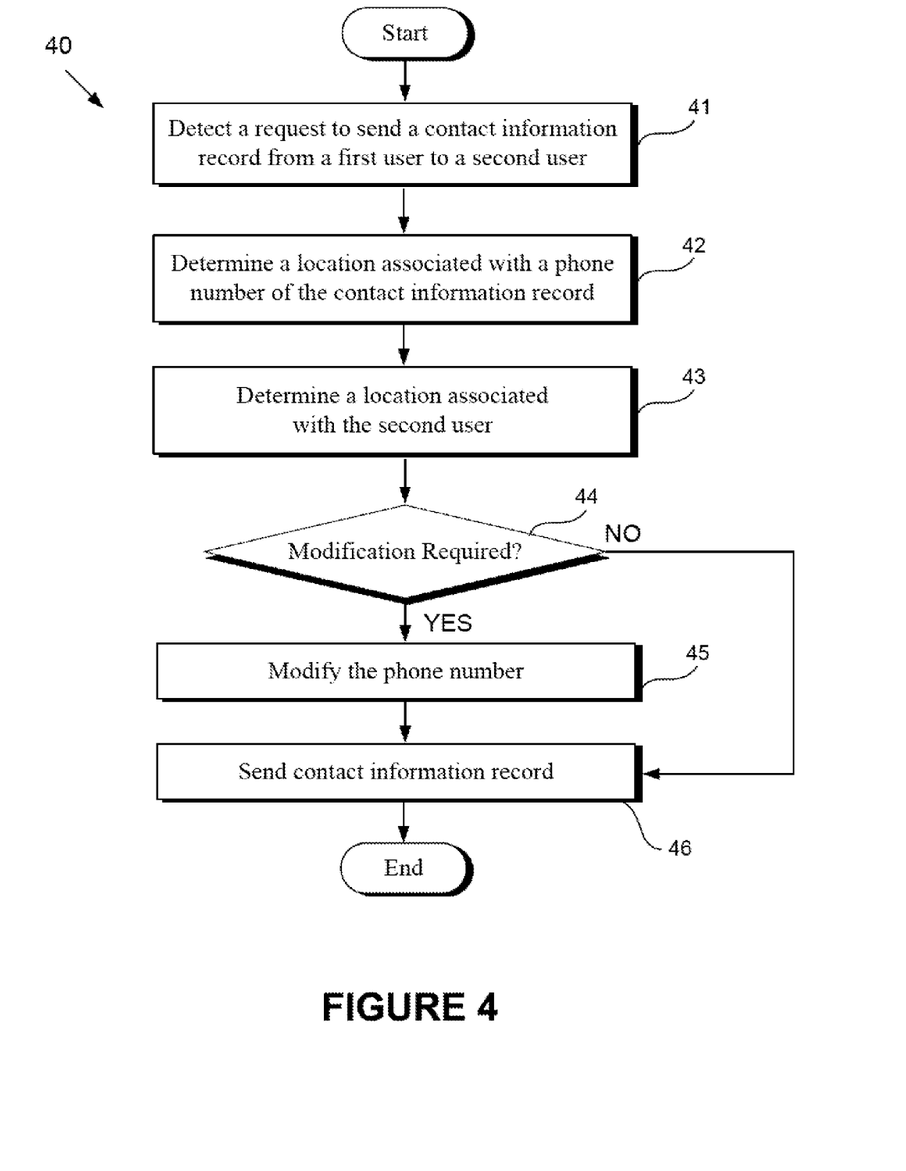
FIG. 4 is a flow diagram of a process that can be used by a device to modify a phone number when sending a contact information record to another device according to an embodiment of the present invention.

FIG. 4 is a flow diagram of a process 40 that can be used by a device (e.g., device 1 of FIGS. 1-3) to modify a phone number when sending a contact information record to another device (e.g., device 4 of FIGS. 1 and 3) according to an embodiment of the present invention. Process 40 starts when a user or automated process initiates the transfer of a contact information record. At block 41, process 40 detects a request to send a contact information record from a first user to a second user. For example, a contacts managing application on a device may present contact records with a share option (e.g., provided via a contact sharing module 14 of FIG. 1) that allows a user to share a contact information record with other users. Process 40 may detect such an option being selected. As another example, a contact information may be received, for example, when another user sends a text message to the user of the device requesting contact information. Process 40 may detect such a request being received.

At block 42, process 40 determines a location associated with a phone number of the contact information record. The location associated with the contact information record may be determined by pinging a service provider to provide the location in which the phone number is registered. Alternatively, the location associated with the contact information record may be determined by identifying an associated information field in the contact information record. As a specific example, the process 40 may identify that the phone number is the "work" phone number of the contact record and identify the location as the "work" address listed in the contact information record. As another example, the location associated with the contact information record may be stored locally in memory or hardware on the device, for example, on an inserted SIM card and received from there. The location can be any information specific to the dialing prefix elements that may be required to call the device from remote locations. Thus, location information may identify a geographic address, geographic area, or may simply be the prefix itself since such a prefix is associated with a particular location.

At block 43, process 40 determines a location associated with the second user. This can be accomplished in various ways. For example, the location associated with the second user can be inferred from the information that will be used to send the contact information, e.g., the second user's own phone number prefix, e-mail address, contact information records, etc. Alternatively, the location associated with the second user can also be determined by contacting a service provider or other remote information source. The location can be any information that identifies a geographic address, geographic area, or may simply be a dialing prefix associated with a phone number of the second user since such a prefix is associated with a particular location.

At block 44, process 40 determines whether a modification of the telephone number is required. If not, the process 40 proceeds to block 46 to send the contact information record without modifying the phone number. If a modification of the phone number is required, however, the process first proceeds to block 45 to modify the phone number. Modifying the phone number may involve adding or deleting a country code, area code, entry code, exit code, or any other suitable modification that facilitates direct calling of the phone number by the second user who is to receive the modified phone number. Modifying a phone number may be accomplished via a contact adjusting module such as contact adjusting module 15 of FIG. 1. After the process 40 sends the contact information record in block 46 the process 40 ends.

Figure 5:
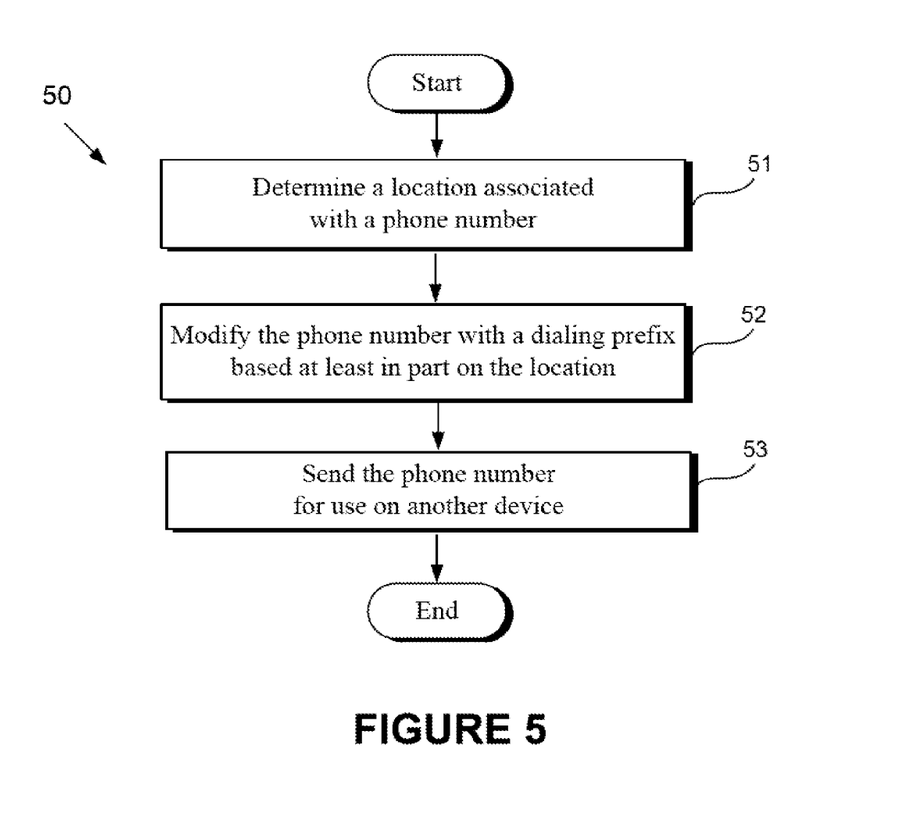
FIG. 5 is a flow diagram of a process that can be used by a device to modify a phone number when sending a contact information record to another device according to an embodiment of the present invention.

FIG. 5 is a flow diagram of a process 50 that can be used by a device (e.g., device 1 of FIGS. 1-3) to modify a phone number when sending a contact information record to another device (e.g., device 4 of FIGS. 1 and 3) according to an embodiment of the present invention.

Process 50 starts when a user or automated process initiates the transfer of a contact information record. At block 51, process 50 determines a location associated with a phone number. The location associated with the phone number may be determined by pinging a service provider to provide the location in which the phone number is registered. Alternatively, the location associated with the contact information record may be determined by identifying an associated information field in a contact information record. As another example, the location associated with the phone number may be stored locally in memory or hardware on the device, for example, on an inserted SIM card and received from there. The location can be any information specific to the dialing prefix elements that may be required to call the device from remote locations. Thus, location information may identify a geographic address, geographic area, or may simply be the prefix itself since such a prefix is associated with a particular location.

At block 52, process 51 modifies the phone number with a dialing prefix based at least in part on the location associated with the phone number. Modifying the phone number may involve adding or deleting a country code, area code, entry code, exit code, or any other suitable modification that facilitates direct calling of the phone number.

At block 53, the process 53 involves sending the phone number for use on another device. The phone number can be sent by itself or as pail of a vCard or other contact information record. The phone number can be sent via a text message, e-mail message, or another other form of electronic transmission. The phone number can be sent via a telephone network, a data network, any other type of network, or through a combination of network types.

Figure 6:
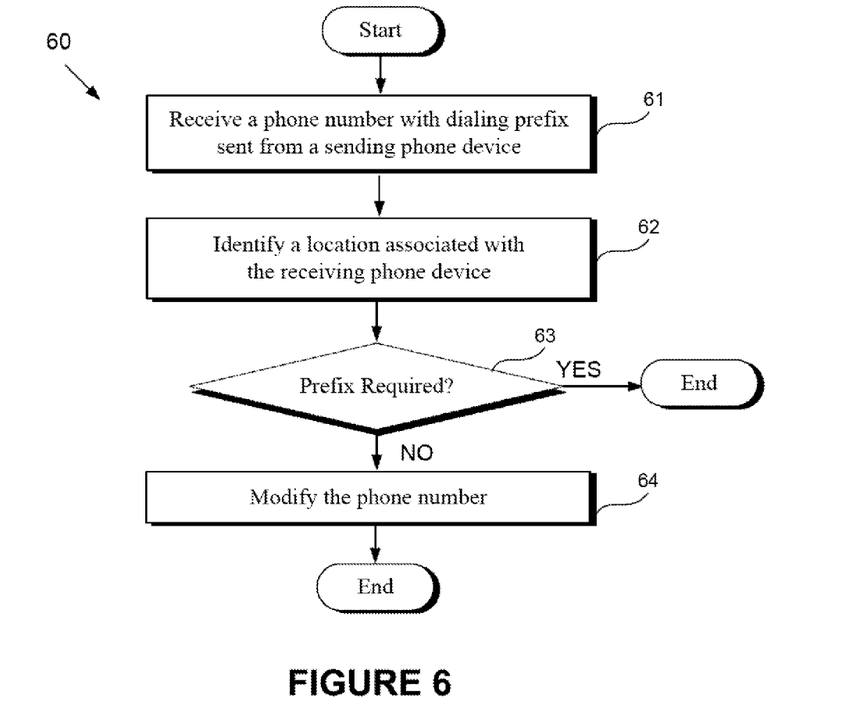
FIG. 6 is a flow diagram of a process that can be used by a device to modify a phone number at some point after receiving the phone number according to an embodiment of the present invention.

FIG. 6 is a flow diagram of a process that can be used by a device (e.g., device 4 of FIGS. 1 and 3) to modify a phone number at some point after receiving the phone number according to an embodiment of the present invention. At block 61, the process 60 receives a phone number with a dialing prefix included as sent from a sending phone device (e.g., from device 1 of FIGS. 1-3). This may occur in various circumstances. In one scenario, sending phone devices are configured to always send prefix information and the receiving device can remove unnecessary dialing prefix portions. In another scenario, some sending devices may send prefix information and other sending devices may not send prefix information with phone numbers.

At block 62, the process 60 identifies a location associated with the receiving phone device. While in the exemplary process 60 the location is identified after the receiving of the phone number, in other embodiments, it occurs prior to receiving the phone number. The location can be identified in various ways. For example, the location associated with the receiving phone device can be inferred or determined from information associated with the receiving phone device such as its phone number prefix, an associated e-mail address, contact information records associated with the receiving phone device, etc. Alternatively, the location associated with the receiving phone device can also be determined by contacting a service provider or other remote information source. The location can be any information that identifies a geographic address, geographic area, or may simply be a dialing prefix associated with a phone number of the receiving phone device since such a prefix is associated with a particular location.

At block 63, process 60 determines whether the prefix is required. If the prefix is required the process ends. If the full prefix is not required, at block 64, process 60 modifies the phone number. This may involve removing all or a portion of the prefix or otherwise changing the prefix. After modifying the phone number, process 60 ends.

Figure 7:
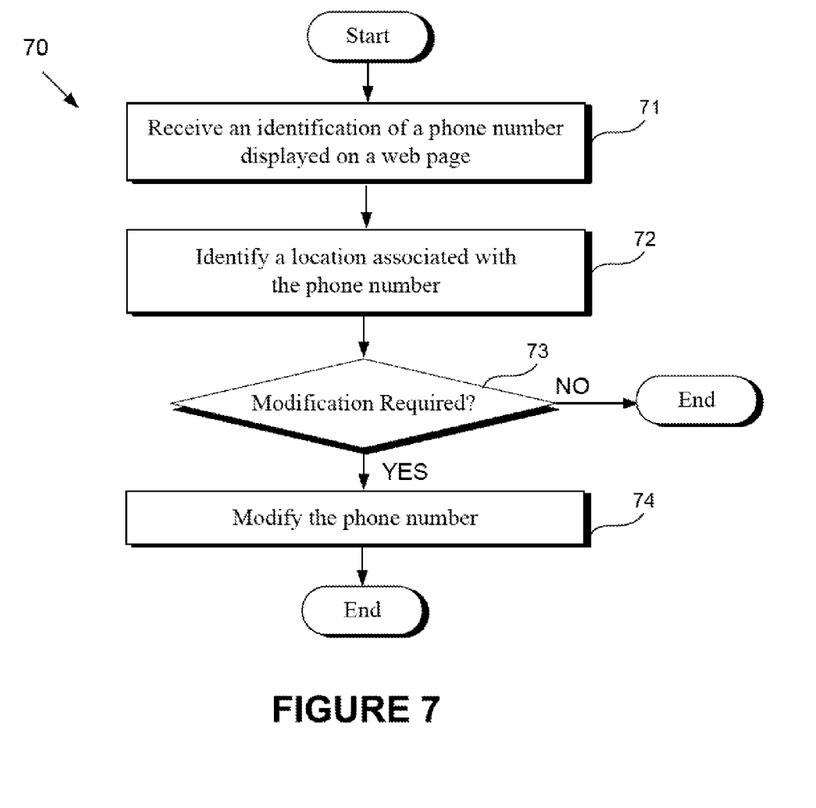
FIG. 7 is a flow diagram of a process that can be used by a device to modify a phone number at some point after receiving the phone number according to an embodiment of the present invention.

FIG. 7 is a flow diagram of a process 70 that can be used by a device (e.g., any of devices 1, 4, 7, 8 of FIG. 1) to modify a phone number at some point after receiving the phone number according to an embodiment of the present invention. At block 71, the process 70 receives an identification of a phone number displayed on a web page. For example, a user viewing a restaurant's web page may identify and select to call a phone number of the restaurant displayed on the web page. As another example, a user viewing a web page listing contact information may select to import the listed contacts on the web page into contact information records on the user's local device.

At block 72, the process identifies a location associated with the phone number. The location can be identified in various ways. For example, the location can be determined using other information on the web page or in tags provided with the web page. Such tags, which may or may not be specialized tags specifically for the purpose of identifying phone number location information, for example, may identify the location associated with the phone number by providing a street address, identifying a geographic area, a dialing prefix, or other information. Alternatively, the location associated with the phone number can also be determined by contacting a service provider or other remote information source. Generally, the location can be any information that identifies a geographic address, geographic area, or may simply be a dialing prefix associated with a phone number of the phone device since such a prefix is associated with a particular location.

At block 73 the process determines whether a modification is required. If not, the process ends. If the a modification is required, at block 74, process 70 modifies the phone number. This may involve adding a prefix, removing all or a portion of the prefix, or otherwise changing the prefix. After modifying the phone number, process 70 ends.

Although embodiments described above make specific reference to a mobile device, those skilled in the art will appreciate that techniques described herein can be applied to any type of device including but not limited to mobile devices (e.g., smart phones, tablet computers, laptop computers, or the like) and stationary devices (e.g., desktop computer systems, servers, etc.). Likewise, an accessory can be any peripheral device suitable for operation with a given computer system or device.

Embodiments of the present invention can be realized using any combination of dedicated components and/or programmable processors and/or other programmable devices. The various processes described herein can be implemented on the same processor or different processors in any combination. Accordingly, where components are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable media encoded with the program code may be packaged with a compatible electronic device, or the program code may be provided separately from electronic devices (e.g., via Internet download).

Thus, although the invention has been described with respect to specific embodiments, it will be appreciated that the invention is intended to cover all modifications and equivalents within the scope of the following claims.

What is claimed is:

1. A method comprising:
    detecting, at a user interface of a first device, a request to send a contact information record from the first device to a second device, wherein the contact information record is stored on the first device;
    determining, by the first device, a location associated with a phone number of the contact information record, wherein the phone number is assigned to the first device or assigned to a third device that is different than the second device;
    determining, by the first device, a location associated with the second device;
    modifying, by the first device, the phone number of the contact information record with a dialing prefix based at least in part on:
        the location associated with the phone number; and
        the location associated with the second device; and
    sending, by the first device, the contact information record including the modified phone number to the second device.

2. The method of claim 1 wherein the phone number of the contact information record is a first phone number, wherein the request requests sending of the contact information record using a second phone number assigned to the second device, and wherein the second phone number is used to determine the location associated with the second device.

3. The method of claim 1 wherein the prefix allows a direct call from the second device to the first device.

4. The method of claim 1 wherein the first device is a phone and the phone number of the contact information record is the phone number of the phone.

5. The method of claim 4 wherein determining the location associated with the phone number is based at least in part on phone registration information for the phone received from a phone network service provider or from a home location registration (HLR) record.

6. The method of claim 4 wherein determining the location associated with the phone number is based at least in part on phone registration information for the phone stored on a subscriber identification module (SIM) card or other storage device on the phone.

7. The method of claim 4 wherein determining the location associated with the phone number is based at least in part on an IP address associated with the phone number.

8. The method of claim 4 wherein determining the location associated with the phone number comprises:
    identifying whether the phone number is a home phone number or a work phone number;
    identifying an address record, wherein the identified address record is a home address record when the phone number is identified as a home phone number and a work address record when the phone number is identified as a work phone number; and
    determining the location based on the address record.

9. The method of claim 1 wherein the phone number is assigned to the third device, wherein determining the location associated with the phone number comprises sending a request from the first device to the third device and receiving information from the third device, and wherein the information received from the third device comprises the location associated with the phone number or the prefix.

10. The method of claim 1 wherein the request to send the contact information record from the first device to the second device is a request initiated by interaction with a web page to send the contact information record to the second device accessing the web page.

11. The method of claim 10 wherein determining the location associated with the phone number comprises:
    identifying a phone number field on the web page; and
    determining the location by identifying location information associated with the phone number field on the web page.

12. The method of claim 10 wherein determining the location associated with the phone number comprises determining the location by identifying location information associated with an Internet Protocol (IP) address associated with the web page.

13. A method comprising:
    receiving, at a first device, a contact information record from a mobile phone device;
    determining, by the first device, a location associated with a phone number of the contact information record, the phone number to be sent from the mobile phone device to a second device via the first device, wherein the phone number is assigned to the mobile phone device or assigned to a third device that is different than the first device and the second device;
    determining, by the first device, a location associated with the second device;
    modifying, by first the device, the phone number with a dialing prefix based at least in part on:

the location associated with the phone number; and
the location associated with the second device; and
sending, by the first device, the contact information record including the phone number modified with the dialing prefix to the second device.

14. The method of claim 13 wherein the prefix allows a direct call from the second device to the mobile phone device.

15. The method of claim 13 wherein determining the location associated with the phone number is based at least in part on phone registration information for the mobile phone device received from a phone network service provider or from a home location registration (HLR) record.

16. A method comprising:
receiving, by a receiving phone device, a contact information record sent from a sending phone device;
determining, by the receiving phone device, a location associated with a phone number of the contact information record, wherein the phone number is assigned to the sending phone device or assigned to a third device that is different than the receiving phone device;
determining, by the receiving phone device, a location associated with the receiving phone device;
modifying, by the receiving phone device, the phone number based at least in part on:
the location associated with the phone number; and
the location associated with the receiving phone device; and
storing, by the receiving phone device, the contact information record including the modified phone number on the receiving phone device.

17. The method of claim 16 wherein modifying the phone number comprises removing at least a portion of a dialing prefix based on determining that the portion is not needed to call from the location associated with the receiving phone device to the location associated with the sending phone device.

18. The method of claim 16 wherein determining the location associated with the receiving phone number is based at least in part on phone registration information for the phone received from a phone network service provider or from a home location registration (HLR) record.

19. A computer program product comprising a non-transitory computer readable storage medium encoded with program instructions that, when executed by a processor in a first device, cause the processor to execute a method comprising:
detecting, at a user interface of the first device, a request to send a contact information record from the first device to a second device, wherein the contact information record is stored on the first device;
determining, by the first device, a location associated with a phone number of the contact information record, wherein the phone number is assigned to the first device or assigned to a third device that is different than the second device;
determining, by the first device, a location associated with the second device;
modifying, by the first device, the phone number of the contact information record with a dialing prefix based at least in part on:
the location associated with the phone number; and
the location associated with the second device; and
sending, by the first device, the contact information record including the modified phone number to the second device.

20. The computer program product of claim 19 wherein determining the location associated with the phone number is based at least in part on phone registration information for the first device received from a phone network service provider or from a home location registration (HLR) record.

21. The computer program product of claim 19 wherein the prefix comprises a country code and area code.

22. The computer program product of claim 19 wherein the prefix comprises an entry code or an exit code.

23. A computer device comprising:
a memory configured to store contact information records and instructions; and
a processor for executing the instructions to perform steps comprising:
receiving, by the computer device, a contact information record sent from a sending device;
determining, by the computer device, a location associated with a phone number of the contact information record, wherein the phone number is assigned to the sending device or assigned to a third device that is different than the computer device;
determining, by the computer device, a location associated with the computer device;
modifying, by the computer device, the phone number of the contact information record to add or modify a dialing prefix based at least in part on:
the location associated with the phone number; and
the location associated with the computer device; and
storing, by the computer device, the contact information record including the modified phone number on the computer device.

24. The computer device of claim 23 wherein modifying the phone number occurs in response to detecting receipt of the contact information record at the computer device.

* * * * *